United States Patent
Kakinuma et al.

(10) Patent No.: US 10,147,967 B2
(45) Date of Patent: Dec. 4, 2018

(54) CYLINDRICAL BATTERY

(71) Applicant: Panasonic Intellectual Property Management Co., Ltd., Osaka (JP)

(72) Inventors: Akira Kakinuma, Osaka (JP); Keisuke Yoneda, Osaka (JP); Nozomu Tsukayama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 16 days.

(21) Appl. No.: 15/311,456

(22) PCT Filed: Jun. 17, 2015

(86) PCT No.: PCT/JP2015/003019
§ 371 (c)(1),
(2) Date: Nov. 15, 2016

(87) PCT Pub. No.: WO2016/013149
PCT Pub. Date: Jan. 28, 2016

(65) Prior Publication Data
US 2017/0084947 A1    Mar. 23, 2017

(30) Foreign Application Priority Data
Jul. 24, 2014   (JP) ................. 2014-150653

(51) Int. Cl.
*H01M 10/0525* (2010.01)
*H01M 2/02* (2006.01)
*H01M 2/08* (2006.01)

(52) U.S. Cl.
CPC ......... *H01M 10/0525* (2013.01); *H01M 2/02* (2013.01); *H01M 2/022* (2013.01);
(Continued)

(58) Field of Classification Search
CPC .......... H01M 2/02; H01M 2/08; H01M 2/022; H01M 2/026; H01M 10/0525; H01M 2220/30
See application file for complete search history.

(56) References Cited

U.S. PATENT DOCUMENTS

2013/0316209 A1* 11/2013 Masumoto ............... H01M 2/08
429/94
2014/0152890 A1* 6/2014 Rayner ................. G06F 1/1626
348/376

FOREIGN PATENT DOCUMENTS

JP          1-063065 U      4/1989
JP          3-283257        12/1991
(Continued)

OTHER PUBLICATIONS

International Search Report of PCT application No. PCT/JP2015/003019 dated Sep. 15, 2015.

*Primary Examiner* — Muhammad S Siddiquee
(74) *Attorney, Agent, or Firm* — McDermott Will & Emery LLP

(57) ABSTRACT

In a cylindrical battery, a bottomed cylindrical battery case includes an opening end bent or curved toward a center axis of the battery case, and a constriction annularly formed around the center axis. A gasket is compressed by the opening end and the constriction, and a rim portion of the sealing member is grasped by the compressed gasket. The outer diameter of the battery case is 10 mm or less. A first corresponding line corresponds to the rim of the sealing member in a projected image of the sealing member on the virtual plane perpendicular to the center axis of the battery case, and a second corresponding line corresponds to a tip edge of the opening end in a projected image. In this case, (Continued)

deviation d of the second corresponding line from the first corresponding line toward the center axis satisfies −0.1 mm≤d≤+0.5 mm.

5 Claims, 3 Drawing Sheets

(52) U.S. Cl.
CPC ............. *H01M 2/026* (2013.01); *H01M 2/08* (2013.01); *H01M 2220/30* (2013.01)

(56) References Cited

FOREIGN PATENT DOCUMENTS

| | | |
|---|---|---|
| JP | 3-283258 | 12/1991 |
| JP | 6-251758 | 9/1994 |
| JP | 2000-306557 | 11/2000 |

\* cited by examiner

CYLINDRICAL BATTERY

CROSS-REFERENCE TO RELATED APPLICATIONS

This application is a U.S. national stage application of the PCT International Application No. PCT/JP2015/003019 filed on Jun. 17, 2015, which claims the benefit of foreign priority of Japanese patent application No. 2014-150653 filed on Jul. 24, 2014, the contents all of which are incorporated herein by reference.

TECHNICAL FIELD

The present invention relates to a cylindrical battery including a battery case, such as a lithium ion secondary battery.

BACKGROUND ART

A cylindrical battery such as a lithium ion secondary battery includes: a bottomed cylindrical battery case; an electrode group stored together with an electrolyte in the battery case; a disk-like sealing member for sealing an opening of the battery case; and an annular gasket interposed between the opening of the battery case and the sealing member. A drawing process is applied to the opening of the battery case. Thus, the gasket is compressed, and the sealing member is fixed to the opening of the battery case.

Specifically, by applying the drawing process to the opening of the battery case, the opening end of the battery case is bent or curved toward the center axis of the battery case, and an annularly extending constriction is formed around the center axis in the battery case. The gasket is compressed by the opening end and the constriction, and the rim portion of the sealing member is grasped by the compressed gasket.

Conventionally, in order to prevent the battery case from breaking due to the increase in internal pressure of the cylindrical battery, a pressure reducing mechanism such as a pressure reducing valve is disposed in the sealing member. Furthermore, in order to make the pressure reducing mechanism sufficiently exhibit its pressure reducing capability, the sealing member is firmly fixed to the battery case (Patent Literature 1 or 2, for example).

CITATION LIST

Patent Literature

PTL 1: Unexamined Japanese Patent Publication No. H06-251758
PTL 2: Unexamined Japanese Patent Publication No. 2000-306557

SUMMARY OF THE INVENTION

Technical Problem(s)

Accompanying the recent miniaturization of an electronic apparatus, it is desired to downsize a cylindrical battery used as a power source of the electronic apparatus, and, especially, desired to decrease the outer diameter of a battery case. When the outer diameter of the battery case is decreased, however, the size of a sealing member is also decreased, and hence it becomes difficult to attach a pressure reducing mechanism to the sealing member. Alternatively, even when the pressure reducing mechanism can be attached to the sealing member, it is difficult to make the pressure reducing mechanism exhibit a sufficiently high pressure reducing capability.

Under such a background, in a small-sized cylindrical battery, the following method is considered as a method of preventing the battery case from breaking due to the increase in internal pressure. In other words, when the internal pressure of the cylindrical battery has increased, the sealing member is made to drop from the battery case using the internal pressure before the internal pressure arrives at a pressure such that it causes the breakage of the battery case. Then, as a method of achieving this, a method of loosely fixing the sealing member to the battery case is considered normally. In this case, however, the sealability of the battery case is low, and leak of the electrolyte is apt to occur. In the small-sized cylindrical battery, thus, it is difficult to achieve both the safety indicating the prevention of the breakage of the battery case and the sealability indicating the prevention of the leak of the electrolyte.

The objective of the present invention is to provide a small-sized cylindrical battery having both the safety and the sealability.

Solution(s) to Problem(s)

A cylindrical battery of the present invention includes: a bottomed cylindrical battery case; an electrode group stored together with an electrolyte in the battery case; a disk-like sealing member for sealing an opening of the battery case; and an annular gasket interposed between the opening of the battery case and the sealing member. The battery case includes an opening end that is bent or curved toward the center axis of the battery case, and a constriction annularly formed around the center axis. The gasket is compressed by the opening end and the constriction, and a rim portion of the sealing member is grasped by the compressed gasket. The outer diameter of the battery case is 10 mm or less. It is assumed that a first corresponding line corresponds to the rim of the sealing member in a projected image of the sealing member on a virtual plane perpendicular to the center axis of the battery case, and a second corresponding line corresponds to the tip edge of the opening end in a projected image of the opening end on the virtual plane. In this case, deviation d of the second corresponding line from the first corresponding line toward the center axis satisfies $-0.1 \text{ mm} \leq d \leq +0.5 \text{ mm}$.

Advantageous Effect(s) of Invention

The cylindrical battery of the present invention achieves both the safety and the sealability although the cylindrical battery is small.

DESCRIPTION OF EMBODIMENTS

Figure 1:
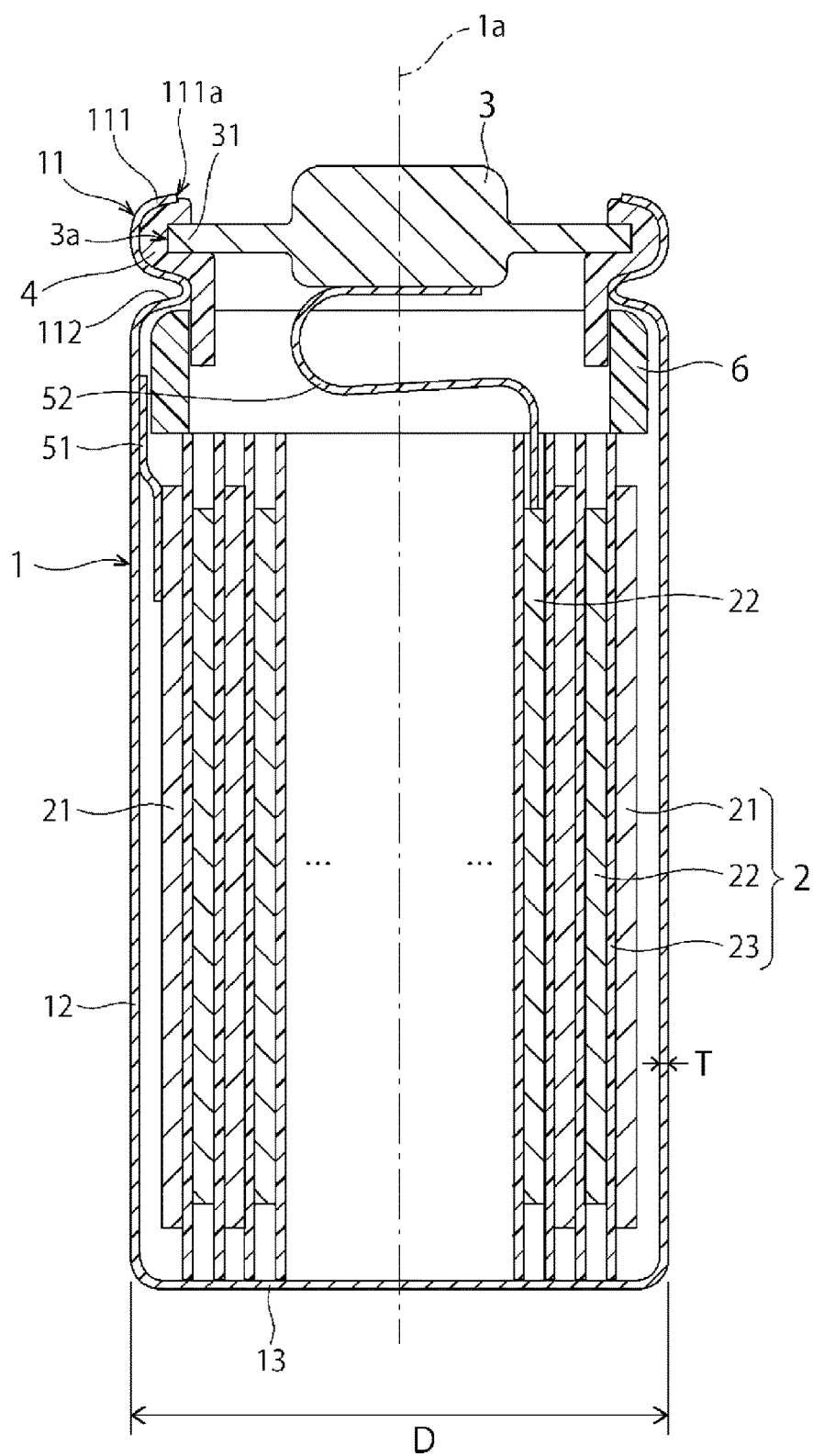
FIG. 1 is a sectional view schematically showing a cylindrical battery in accordance with an exemplary embodiment of the present invention.

First, a cylindrical battery of the present invention is described.

The cylindrical battery of the present invention includes: a bottomed cylindrical battery case; an electrode group stored together with an electrolyte in the battery case; a disk-like sealing member for sealing an opening of the battery case; and an annular gasket interposed between the opening of the battery case and the sealing member. The battery case includes an opening end that is bent or curved toward the center axis of the battery case, and a constriction annularly formed around the center axis. The gasket is compressed by the opening end and the constriction, and a rim portion of the sealing member is grasped by the compressed gasket. The outer diameter of the battery case is 10 mm or less. Preferably, the outer diameter of the battery case is 6 mm or less. When it is assumed that a first corresponding line corresponds to the rim of the sealing member in a projected image of the sealing member on a virtual plane perpendicular to the center axis of the battery case, and a second corresponding line corresponds to the tip edge of the opening end in a projected image of the opening end on the virtual plane, deviation d of the second corresponding line from the first corresponding line toward the center axis satisfies −0.1 mm≤d≤+0.5 mm.

The above-mentioned range of deviation d is obtained on the basis of the experiment (described later) having been performed by the inventors. When deviation d is within the above-mentioned range, the following phenomena are obtained. During normal use of the cylindrical battery, dropping of the sealing member is prevented even if the temperature of the cylindrical battery increases to increase the internal pressure. In the case that an abnormality or the like occurs in an apparatus, even if the battery is abnormally overheated to excessively increase the internal pressure, the sealing member can be made to drop from the battery case using the internal pressure before the battery case breaks. Furthermore, when deviation d is within the above-mentioned range, the gasket is compressed appropriately, and hence leak of the electrolyte hardly occurs. The cylindrical battery achieves both the safety indicating the prevention of the breakage of the battery case and the sealability indicating the prevention of the leak of the electrolyte, although the cylindrical battery is small.

In the cylindrical battery, preferably, the tip edge of the opening end is directed obliquely toward the opposite side to the bottom of the battery case. In the direction along the center axis of the battery case, preferably, distance z from the upper surface of the rim portion of the sealing member to the position corresponding to the tip edge of the opening end satisfies 0.1 mm≤z≤0.3 mm. Here, the upper surface means the surface that faces upward when the cylindrical battery is installed so that the opening end of the battery case faces upward.

Furthermore, in the cylindrical battery, it is preferable that average compressibility R of the gasket satisfies 10%≤R≤60%. Thus, the cylindrical battery has a high sealability.

Next, the exemplary embodiment of the present invention is specifically described with reference to the accompanying drawings.

[1] Configuration of Cylindrical Battery

FIG. 1 is a sectional view schematically showing a cylindrical battery in accordance with an exemplary embodiment of the present invention. As shown in FIG. 1, the cylindrical battery includes: bottomed cylindrical battery case 1; electrode group 2 stored together with an electrolyte in battery case 1; disk-like sealing member 3 for sealing opening 11 of battery case 1; and annular gasket 4 interposed between opening 11 of battery case 1 and sealing member 3.

[1-1] Battery Case

Battery case 1 includes opening end 111 that is bent or curved toward center axis 1a of battery case 1, and constriction 112 annularly formed around center axis 1a. Such battery case 1 is manufactured in the following process. First, by deep-drawing a stainless steel plate having a uniform thickness, battery case 1 including opening end 111 that is not bent or curved and including no constriction 112 is molded. Then, electrode group 2 is stored in battery case 1, and, after that, battery case 1 is laterally drawn to form constriction 112. Next, gasket 4 is inserted into opening 11 of battery case 1. At this time, the position of gasket 4 is determined by constriction 112. Then, an electrolyte is injected into battery case 1. After that, opening end 111 is bent or curved by laterally drawing opening 11 of battery case 1 in a state where sealing member 3 is mounted inside gasket 4. As a result, sealing member 3 is fitted into opening 11 of battery case 1 via gasket 4. In other words, in the cylindrical battery, gasket 4 is compressed by opening end 111 and constriction 112, and rim portion 31 (peripheral portion) of sealing member 3 is grasped by compressed gasket 4. Furthermore, compressed gasket 4 adheres to the inner surface of battery case 1 and rim portion 31 of sealing member 3. Thus, the sealability of the cylindrical battery can be improved.

Outer diameter D of battery case 1 is 10 mm or less, preferably 6 mm or less. Specifically, outer diameter D is the outer diameter of a portion different from a portion (opening end 111 or constriction 112) having undergone the lateral drawing. Preferably, thickness T of side wall 12 of battery case 1 satisfies 0.05 mm≤T≤0.25 mm. Particularly preferably, thickness T satisfies T≤0.15 mm. When thickness T of side wall 12 of battery case 1 is greater than 0.25 mm, battery case 1 hardly deforms, and hence a high internal pressure is required for making sealing member 3 drop. While, when thickness T of side wall 12 of battery case 1 is smaller than 0.05 mm, battery case 1 is apt to deform, and hence the electrolyte is apt to leak. Here, ratio rT thickness T of side wall 12/thickness of bottom 13) of thickness T of side wall 12 of battery case 1 to the thickness of bottom 13 satisfies 0.20≤rT≤1.20, preferably satisfies 0.33≤rT≤1.05.

[1-2] Sealing Member and Gasket

Sealing member 3 is made of an electrically conductive material such as stainless steel or aluminum. Gasket 4 is made of an elastic material. Examples of the elastic material include polypropylene (PP), polyethylene (PE), polyphenylene sulfide (PPS), tetrafluoroethylene-perfluoroalkyl vinyl ether copolymer (PFA), and crosslinked rubber. Preferably, bending elastic modulus k of the elastic material constituting gasket 4 satisfies 0.4 GPa≤k≤1.4 GPa.

[1-3] Electrode Group

Electrode group 2 includes negative electrode plate 21, positive electrode plate 22, and separator 23. In electrode group 2, negative electrode plate 21 and positive electrode plate 22 are stacked and wound together, with separator 23 interposed between them. In order to prevent the winding of electrode group 2 from becoming loose, the end of winding of at least one of negative electrode plate 21 and positive electrode plate 22 is fixed to the outer peripheral surface of electrode group 2 via fixing tape. Here, the configuration of electrode group 2 is not limited to this.

Negative electrode plate 21 is electrically connected to battery case 1 via negative electrode lead 51. Battery case 1 serves as a negative electrode terminal. Specifically, one end of negative electrode lead 51 is electrically connected to negative electrode plate 21, and the other end thereof is bonded to the inner surface of battery case 1 by a welding means such as spot welding. Here, the other end of negative electrode lead 51 may be electrically connected to battery case 1 by being brought into contact with the inner surface of battery case 1.

Positive electrode plate 22 is electrically connected to sealing member 3 via positive electrode lead 52. Sealing member 3 serves as a positive electrode terminal. Specifically, one end of positive electrode lead 52 is electrically connected to positive electrode plate 22, and the other end thereof is bonded to the bottom surface of sealing member 3 by a welding means such as spot welding. Here, positive electrode lead 52 is passed through annular electrical-insulating member 6 disposed between electrode group 2 and sealing member 3, and electrical insulating member 6 prevents positive electrode lead 52 from coming into contact with negative electrode lead 51 or battery case 1.

[2] Achievement of Both Safety and Sealability

In a small-sized cylindrical battery of the present exemplary embodiment, in order to achieve both the safety indicating the prevention of the breakage of battery case 1 and the sealability indicating the prevention of the leak of the electrolyte, it is preferable to satisfy the following conditions.

Figure 2:
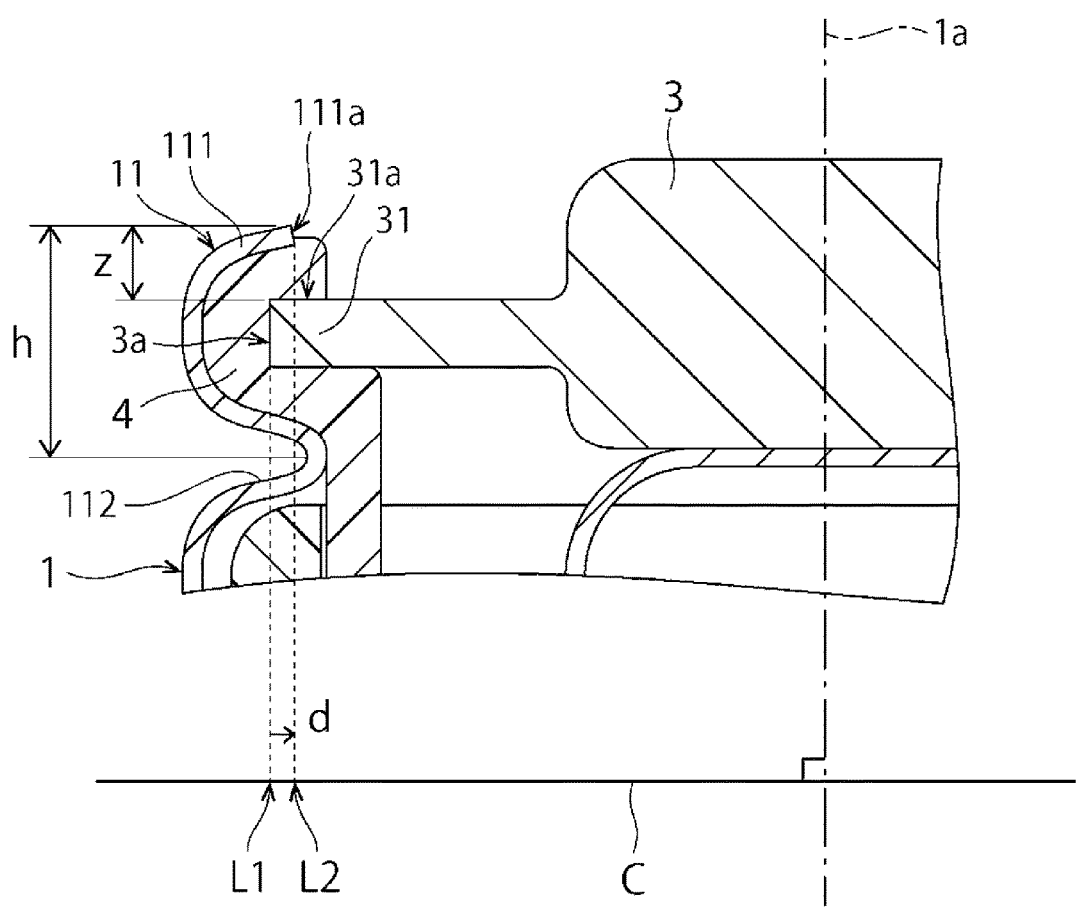
FIG. 2 is a diagram used for describing conditions for achieving both safety and sealability.

FIG. 2 is a diagram used for describing the conditions. As shown in FIG. 2, first, virtual plane C perpendicular to center axis 1a of battery case 1 is assumed. Next, first corresponding line L1 corresponding to rim 3a of sealing member 3 in a projected image of sealing member 3 on virtual plane C, and second corresponding line L2 corresponding to tip edge 111a of opening end 111 in a projected image of opening end 111 on virtual plane C are assumed. When first corresponding line L1 and second corresponding line L2 are assumed in this manner, as a condition for achieving both safety and sealability, it is preferable that deviation d of second corresponding line L2 from first corresponding line L1 toward the center axis satisfies −0.1 mm≤d≤+0.5 mm. It is particularly preferable that deviation d satisfies d≤+0.1 mm.

More preferably, in the above-mentioned cylindrical battery, tip edge 111a of opening end 111 is directed obliquely toward the opposite side to bottom 13 of battery case 1, and the above-mentioned condition is satisfied in this state. In the direction along center axis 1a of battery case 1, preferably, distance z from upper surface 31a of rim 3a of sealing member 3 to the position corresponding to tip edge 111a of opening end 111 satisfies 0.1 mm≤z≤0.3 mm. Here, upper surface 31a means the surface that faces upward when the cylindrical battery is installed so that opening end 111 of battery case 1 faces upward.

Furthermore, in the cylindrical battery, it is preferable that average compressibility R of gasket 4 satisfies 10%≤R≤60%. That is because this state achieves a high sealability of the cylindrical battery. The state where average compressibility R satisfies 10%≤R≤60% is easily achieved when the condition related to deviation d is satisfied. Furthermore, this state is easily achieved also when tip edge 111a of opening end 111 is directed obliquely toward the opposite side to bottom 13 of battery case 1. In addition, for example, the thickness or material of gasket 4 may be selected so that average compressibility R satisfies 10%≤R≤60%.

The conditions related to deviation d, distance z, and average compressibility R are obtained on the basis of the experiment having been performed by the present inventors. Table 1 shows the result of the experiment.

TABLE 1

| Example | Outer diameter D (mm) | Thickness T (mm) | Deviation d (mm) | Distance z (mm) | Distance h (mm) | Average compressibility R (%) | Vent pressure Pv (Pa) | Electrolyte leak |
|---|---|---|---|---|---|---|---|---|
| 1 | 3.6 | 0.08 | +0.02 | 0.19 | 0.80 | 30 | 7.6 | 0/5 |
| 2 | 3.6 | 0.08 | +0.10 | 0.19 | 0.80 | 30 | 9.8 | 0/5 |
| 3 | 3.6 | 0.08 | −0.10 | 0.19 | 0.80 | 30 | 4.8 | 0/5 |
| 4 | 3.6 | 0.08 | +0.12 | 0.19 | 0.80 | 30 | 18.0 | 0/5 |
| 5 | 3.6 | 0.08 | +0.50 | 0.19 | 0.80 | 30 | 24.5 | 0/5 |
| 6 | 3.6 | 0.08 | −0.14 | 0.19 | 0.80 | 30 | 2.9 | 5/5 |
| 7 | 3.6 | 0.08 | −0.08 | 0.19 | 0.98 | 8 | 4.2 | 2/5 |
| 8 | 3.6 | 0.08 | −0.03 | 0.19 | 0.90 | 10 | 5.0 | 0/5 |
| 9 | 3.6 | 0.08 | 0 | 0.19 | 0.80 | 20 | 6.2 | 0/5 |
| 10 | 3.6 | 0.08 | +0.05 | 0.19 | 0.80 | 40 | 7.9 | 0/5 |
| 11 | 3.6 | 0.08 | +0.07 | 0.19 | 0.78 | 60 | 9.7 | 0/5 |
| 12 | 3.6 | 0.08 | +0.09 | 0.19 | 0.78 | 65 | 12.2 | 0/5 |
| 13 | 3.6 | 0.08 | −0.02 | 0.33 | 0.85 | 30 | 5.3 | 1/5 |
| 14 | 3.6 | 0.08 | 0 | 0.30 | 0.82 | 30 | 6.8 | 0/5 |
| 15 | 3.6 | 0.08 | +0.03 | 0.12 | 0.73 | 40 | 9.5 | 0/5 |
| 16 | 3.6 | 0.08 | +0.05 | 0.10 | 0.70 | 40 | 10.8 | 0/5 |
| 17 | 3.6 | 0.08 | +0.02 | 0.19 | 0.80 | 30 | 20.3 | 0/5 |

As shown in Table 1, the present inventors have produced 17 types of cylindrical batteries (examples 1 to 17) among which at least one of deviation d, distance z, and average compressibility R is different. The conditions other than those related to deviation d, distance z, and average compressibility R are described below. In all of examples 1 to 17, stainless steel is used as the material constituting battery case 1, outer diameter D of battery case 1 is set at 3.6 mm, thickness T of side wall 12 of battery case 1 and the thickness of bottom 13 are set at 0.08 mm and 0.1 mm, respectively, and the height of battery case 1 is set at 35.1 mm. In all of examples 1 to 17, stainless steel is used as the material constituting sealing member 3, the outer diameter of sealing member 3 is set at 2.8 mm, and the thickness of rim portion 31 of sealing member 3 is set at 0.25 mm. Furthermore, in all of examples 1 to 17, as the elastic material constituting gasket 4, PFA whose bending elastic modulus k is about 0.6 GPa is used. Here, distance h in Table 1 is the distance from constriction 112 to the position corresponding to tip edge 111a of opening end 111 in the direction along center axis 1a of battery case 1. In the experiment, as the position of constriction 112 used as the reference of distance h, the position at which the depth of constriction 112 is the greatest is employed (FIG. 2).

Figure 3:
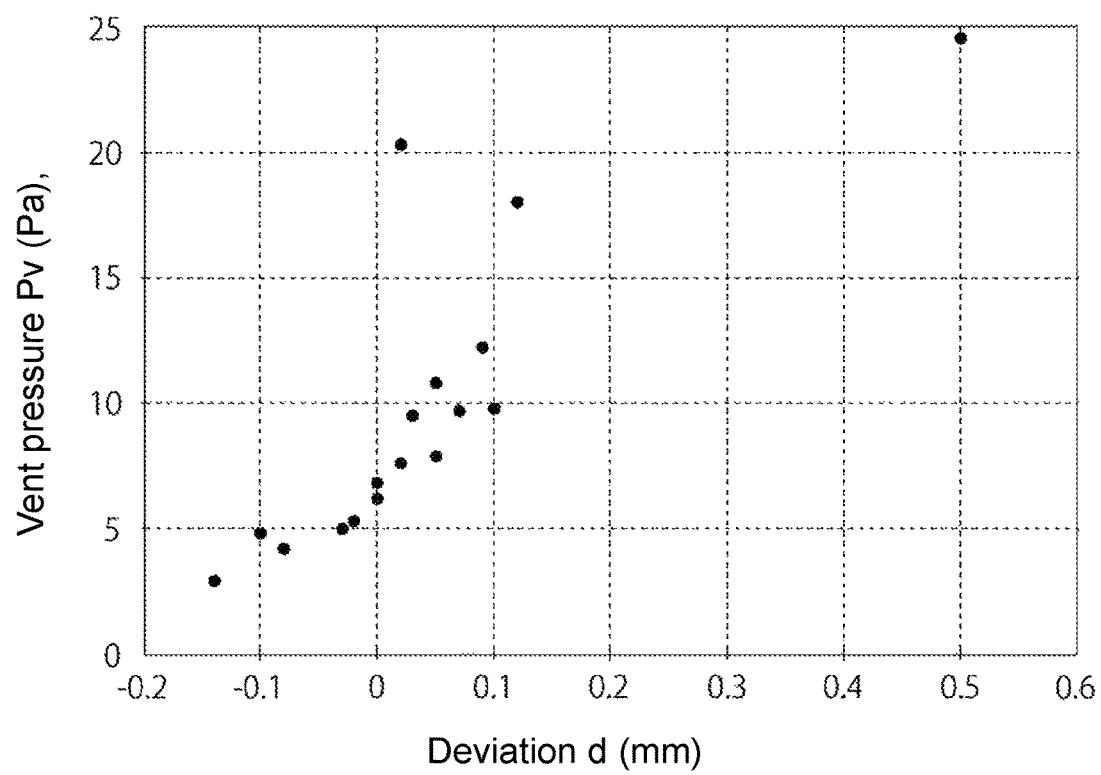
FIG. 3 is a scatter diagram showing the relationship between deviation and vent pressure.

With each of 17 types of cylindrical batteries produced previously, the inventors have made sealing member 3 drop from battery case 1 by increasing the internal pressure, and have measured the internal pressure at the dropping time as vent pressure Pv. Here, in the experiment, a hole is formed in the bottom of a battery, and the internal pressure is increased by injecting water through the hole. FIG. 3 is a scatter diagram showing the measurement results plotted on the coordinates whose horizontal axis shows deviation d and vertical axis shows vent pressure Pv. Furthermore, the inventors have investigated the presence or absence of the leak of the electrolyte from each cylindrical battery (FIG. 1). In the experiment for investigating the leak of the electrolyte, five cylindrical batteries are prepared for each of 17 types, and these batteries are kept in the atmosphere of 60° C. for 10 days. Keeping them in that manner causes vaporization of a solvent component of the electrolyte to forcibly increase the internal pressure, so that the leak is accelerated. After keeping them for 10 days, the inventors have visually recognized the presence or absence of the leak of the electrolyte from each cylindrical battery. Table 1 shows the number of batteries having undergone the leak of the electrolyte.

The inventors have set the preferable range of vent pressure Pv to be 4 MPa≤Pv≤25 MPa. Even if the internal pressure is increased by the exposure to a high temperature (for example) during normal use of the cylindrical battery, the internal pressure at this time is lower than 4 MPa in most cases. Therefore, when vent pressure Pv is 4 MPa or more, the dropping of the sealing member is prevented. Even if an abnormality or the like occurs in an apparatus and the battery is abnormally overheated to excessively increase the internal pressure, when vent pressure Pv is 25 MPa or less, sealing member 3 can be made to drop from battery case 1 using the internal pressure before battery case 1 breaks. From the point of view of safety, it is preferable that vent pressure Pv satisfies Pv≤20 MPa, and it is particularly preferable that vent pressure Pv satisfies Pv≤10 MPa. In order to make vent pressure Pv satisfy the above-mentioned range (4 MPa≤Pv≤25 MPa), the inventors have determined the range of deviation d to be −0.1 mm≤d≤+0.5 mm on the basis of Table 1 and FIG. 3. Then, the inventors have determined the range of distance z to be 0.1 mm≤z≤0.3 mm on the basis of the cylindrical battery satisfying this range of deviation d. Furthermore, in order to achieve a high sealability for certainly preventing the leak of the electrolyte, the inventors have determined the range of average compressibility R of gasket 4 to be 10%≤R≤60% on the basis of Table 1.

The preferable range of deviation d is considered to change in accordance with the length of outer diameter D of battery case 1. Specifically, as outer diameter D of battery case 1 increases, sealing member 3 is apt to drop due to a lower internal pressure. This is because the total pressure applied to sealing member 3 increases in proportion to the opening area of battery case 1. When outer diameter D of battery case 1 of the cylindrical battery is shorter than 10 mm, however, the preferable range of deviation d is considered to be within the range of −0.1 mm≤d≤+0.5 mm, which has been determined by the inventors by using the cylindrical battery in which outer diameter D of battery case 1 is 3.6 mm.

Table 2 shows the result obtained when the same experiment as the above-mentioned experiment is performed using a cylindrical battery (example 18) in which outer diameter D of battery case 1 is 6 mm and a cylindrical battery (example 19) in which outer diameter D of battery case 1 is 10 mm. For these cylindrical batteries, deviation d is set at +0.02 mm, distance z is set at 0.19 mm, distance h is set at 0.80 mm, and average compressibility R is set at 30%. The outer diameter of sealing member 3 is set at 5.36 mm in example 18, and is set at 9.36 mm in example 19. The other conditions of the cylindrical batteries are the same as those of the cylindrical batteries in examples 1 to 17.

TABLE 2

| Example | Outer diameter D (mm) | Thickness T (mm) | Deviation d (mm) | Distance z (mm) | Distance h (mm) | Average compressibility R (%) | Vent pressure Pv (Pa) | Electrolyte leak |
|---|---|---|---|---|---|---|---|---|
| 18 | 6 | 0.08 | +0.02 | 0.19 | 0.80 | 30 | 6.0 | 0/5 |
| 19 | 10 | 0.08 | +0.02 | 0.19 | 0.80 | 30 | 4.1 | 0/5 |

According to the result of the experiment, vent pressure Pv is 6.0 MPa in example 18, and is 4.1 MPa in example 19. These vent pressures Pv satisfy the preferable range (4 MPa≤Pv≤25 MPa), and deviation d (0.02 mm) employed for these cylindrical batteries is included in the range (−0.1 mm≤d≤+0.5 mm) determined by the inventors. Furthermore, as a result of setting average compressibility R at 30%, leak of the electrolyte occurs in neither example 18 nor example 19. Average compressibility R (30%) employed for these cylindrical batteries is included in the range (10%≤R≤60%) determined by the inventors.

When deviation d is within the above-mentioned range, the following advantage can be produced. During normal use of a cylindrical battery, dropping of sealing member 3 is prevented even if the temperature of the cylindrical battery increases to increase the internal pressure. In the case that an abnormality or the like occurs in an apparatus, even if the battery is abnormally overheated to excessively increase the internal pressure, sealing member 3 can be made to drop from battery case 1 using the internal pressure before battery case 1 breaks. Furthermore, when deviation d is within the above-mentioned range, gasket 4 is compressed appropriately, and hence leak of the electrolyte hardly occurs. The cylindrical battery of the present exemplary embodiment achieves both the safety indicating the prevention of the breakage of battery case 1 and the sealability indicating the prevention of the leak of the electrolyte, although the cylindrical battery is small.

When average compressibility R is also within the above-mentioned range, the cylindrical battery has a high sealability.

The components of the present invention are not limited to the above-mentioned exemplary embodiment, but can be variously modified within the technological scope of the claims.

INDUSTRIAL APPLICABILITY

A cylindrical battery of the present invention is useful as a power source for various electronic apparatuses such as a portable digital apparatus.

The invention claimed is:

1. A cylindrical battery comprising:
   a bottomed cylindrical battery case;
   an electrode group stored together with an electrolyte in the battery case;
   a disk-like sealing member for sealing an opening of the battery case; and
   an annular gasket interposed between the opening of the battery case and the sealing member,
   wherein
   the battery case includes an opening end bent or curved toward a center axis of the battery case and a constriction annularly formed around the center axis, the gasket is compressed by the opening end and the constriction, and a rim portion of the sealing member is grasped by the compressed gasket,
   an outer diameter of the battery case is 10 mm or less, and
   a deviation d of a second corresponding line from a first corresponding line toward the center axis satisfies −0.1 mm≤d≤+0.5 mm, the first corresponding line being assumed to correspond to a rim of the sealing member in a projected image of the sealing member on a virtual plane perpendicular to the center axis, the second corresponding line being assumed to correspond to a tip edge of the opening end in a projected image of the opening end on the virtual plane.

2. The cylindrical battery according to claim 1, wherein the tip edge of the opening end is directed obliquely toward an opposite side to a bottom of the battery case.

3. The cylindrical battery according to claim 2, wherein in a direction along the center axis, a distance z from an upper surface of the rim portion of the sealing member to a position corresponding to the tip edge of the opening end satisfies 0.1 mm≤z≤0.3 mm.

4. The cylindrical battery according to claim 1, wherein an average compressibility R of the gasket satisfies 10%≤R≤60%.

5. The cylindrical battery according to claim 1, wherein the outer diameter of the battery case is 6 mm or less.

* * * * *